Dec. 4, 1934.  D. GREGG  1,983,225
INTERNAL COMBUSTION ENGINE
Filed June 9, 1931  2 Sheets-Sheet 2

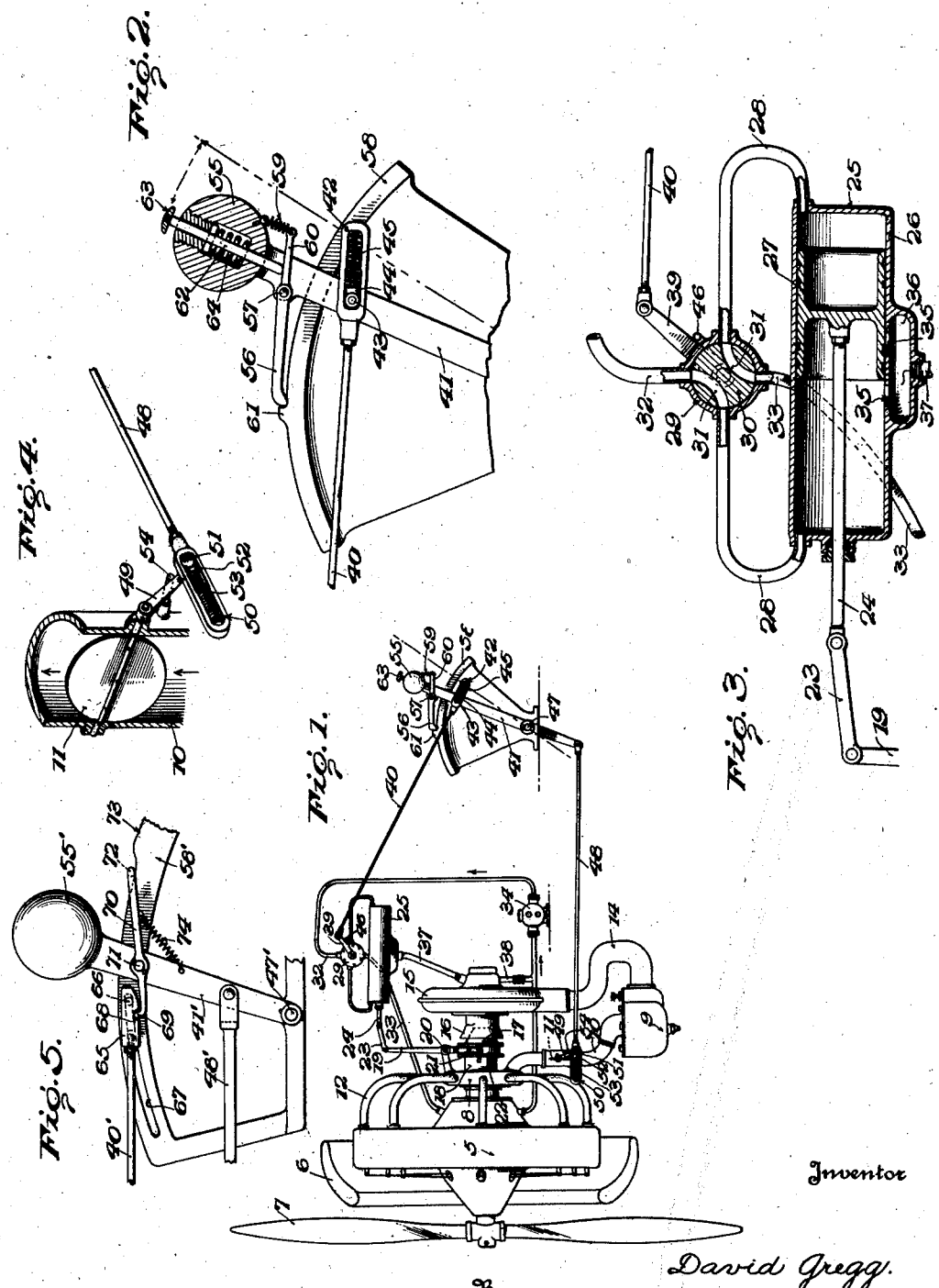

INVENTOR
David Gregg.
BY
F. B. Smith.
ATTORNEY

Patented Dec. 4, 1934

1,983,225

UNITED STATES PATENT OFFICE 1,983,225

INTERNAL COMBUSTION ENGINE

David Gregg, Caldwell Borough, N. J., assignor to Bendix Research Corporation, East Orange, N. J., a corporation of Indiana Application June 9, 1931, Serial No. 543,217

7 Claims. (Cl. 123—119)

This invention relates to internal combustion engines, and more particularly to controls for such engines when equipped with superchargers.

One of the objects of the present invention is to provide an engine equipped with a supercharger with novel means for efficiently governing the operation of the supercharger under the control of the operator.

Another object is to provide novel controlling means for governing the operation of an engine-driven supercharger embodying power means actuated by energy derived from the engine for drivably connecting and disconnecting the supercharger to and from the engine.

A further object is to provide an improved control for the supercharger of an engine which includes a servo-motor operated by the pressure of the oil in the lubricating system of the engine.

Still another object is to provide an engine equipped with a supercharger with novel common control means for governing the actuation of both the supercharger and the throttle valve of the engine.

A still further object is to provide a common control for both the supercharger and the throttle valve of an internal combustion engine embodying novel means for maintaining the supercharger inactive until the throttle valve is fully opened, and then drivably connecting the supercharger to the engine while preventing further actuation of the throttle valve.

These and other objects will appear more fully from a consideration of the detailed description of the invention which follows. Although only two embodiments of the invention have been described and illustrated in the accompanying drawings, it will be expressly understood that the drawings are for the purpose of illustration only and are not to be construed as a limitation of the scope of the invention, reference being had for this purpose to the appended claims.

In the drawings, wherein like reference characters indicate like parts throughout the several views:

Fig. 1 is a diagrammatic view of an engine equipped with a supercharger and provided with a control embodying one form of the present invention;

Fig. 2 is an enlarged side view, with certain parts shown in section, of the main operating lever of the control;

Fig. 3 is an enlarged sectional side view, with certain parts shown in full, of the servo-motor comprising part of the means for drivably connecting and disconnecting the supercharger to and from the engine;

Fig. 4 is an enlarged perspective view, with certain parts cut away, of the means for operating the throttle valve;

Fig. 5 is a view similar to Fig. 2 of another embodiment of the main operating lever of the control;

Figure 7:
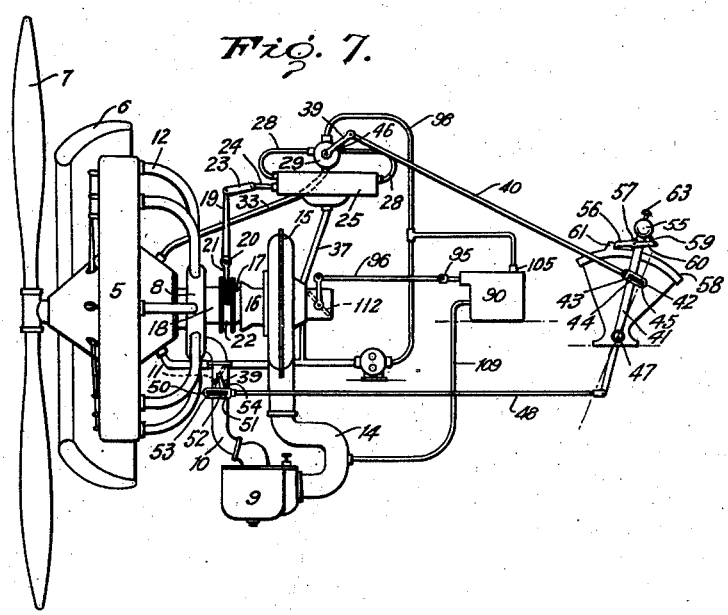
Fig. 7 is a diagrammatic view showing the device of Fig. 6 operatively connected to the apparatus of Fig. 1.

Referring now to the drawings, there is diagrammatically illustrated in Fig. 1 an airplane engine equipped with a supercharger and with novel control means for governing the driving connection and disconnection of the supercharger to and from the engine at the will of the operator, which control means also governs the opening and closing of the engine throttle valve. As shown, the engine 5 is of the usual radial type, having a cowling member 6 and a propeller 7 and provided with an intake manifold 8 to which a combustible mixture is supplied from a carburetor 9 through an intake pipe 10 provided with the usual throttle valve 11, and from which the mixture is distributed to the engine cylinders by leads 12. Carburetor 9 is equipped with a supply pipe or conduit 14 leading from a supercharger 15 of any desired type. As shown, supercharger 15 is of the centrifugal type and is adapted to be driven from the engine 5 through a suitable clutch which, in the form shown, comprises an internally cone-shaped member 16 operatively secured to the shaft of supercharger 15 and a shiftable externally cone-shaped clutch member 17 suitably splined or otherwise drivably connected to the crank shaft 18 or other rotating part of engine 5.

Clutch members 16 and 17 are normally disengaged so that supercharger 15 is inactive, but novel means are provided for shifting clutch element 17 into frictional engagement with element 16 so as to drive the supercharger from the engine and thereby supply, through conduit 14, air under pressure to carburetor 9, whence the supercharged mixture is led to the engine cylinders through intake pipe 10, manifold 8, and leads 12. As shown, the novel means for engaging and disengaging the clutch, and thereby controlling the operation of the supercharger, may embody a shifting lever 19 pivoted as at 20 on a fixed part of the engine and provided at one end with a yoke 21 engaging a suitable shifting collar 22 formed on clutch element 17. At its other end, shifting lever 19 may be connected as by a link 23 to the piston rod 24 of a servo-motor 25.

The power means afforded by servo-motor 25 for drivably connecting and disconnecting the supercharger to and from the engine is adapted to be actuated by energy derived from the engine itself, preferably by the pressure of the oil in the lubricating system of the engine. As shown best in Fig. 3, servo-motor 25 is provided with a cylindrical casing 26 within which is housed a reciprocable piston 27 secured to piston rod 24. At each end of cylindrical casing 26 a pipe or conduit 28 is connected to the interior thereof, which pipes lead to diametrically opposite points of a valve casing 29 within which is housed a valve body 30 having two arcuate passages 31 adapted to connect pipes 28 with a pair of diametrically opposite pipes 32, 33 spaced substantially 90° around valve casing 29 from pipes 28. Pipe 32 is connected to the lubricating system of engine 5 and receives oil under pressure from a suitable pump 34, which may be the main oil circulating pump of the engine, while pipe 33 is an oil return line leading to the sump of engine 5.

Servo-motor casing 26 is also provided intermediate its ends with a pair of oil discharge openings 35 communicating with a common chamber 36 from which leads a pipe 37 which may be connected to any point in the engine lubricating system but acts preferably as the oil supply line to supercharger 15, whence the oil is returned to the lubricating system by a suitable lead 38. Discharge openings 35 are so located that one of them is always in free communication with the interior of servo-motor casing 26 when piston 27 is at either extremity of its reciprocating movement.

With the parts in the position shown in Fig. 3, it will be evident that the oil of the lubricating system supplied by pump 34 and pipe 32 to valve casing 29 will be distributed by one of the passages 31 to the pipe 28 which is connected to the left-hand end, as viewed in the figure, of servo-motor casing 26 so that the pressure of the oil is directed against the left side of piston 27, thereby maintaining it at the right hand limit of its reciprocating travel. The flowing oil is then dscharged through the left discharge opening 35, chamber 36 and pipe 37 to supercharger 15 for lubrication purposes. At the same time, the pipe 28 connected to the right-hand end of casing 26 is in communication through the other passage 31 of valve body 30 with oil return pipe 33. At this time, with piston 27 at the right limit of its reciprocating travel, shifting lever 19 is, through its connection with piston rod 24, moved in a clockwise direction about its pivot 20 so as to maintain clutch element 17 to the left, as viewed in Fig. 1, out of driving engagement with clutch element 16 of the supercharger. Supercharger 15 is therefore inactive, and, if the engine is running, a combustible mixture at atmospheric pressure is supplied thereto in the usual manner, the amount of mixture supplied depending upon the opening of throttle valve 11, controlled in a manner later to be described.

Suitable means are provided for rotating valve body 30 so as to reverse the connections between pipes 32, 33 and 28 and to thereby actuate servo-motor 25 so as to move piston 27 to the left and, in turn, through piston rod 24, link 23 and shifting lever 19, move clutch members 16 and 17 into driving engagement so that supercharger 15 is operated by engine 5. As shown in Figs. 1, 2, and 3, valve body 30 has secured thereto in any suitable manner an operating lever 39 to which is pivotally connected a rod 40, the latter in turn having an operative connection with a main control lever 41 by a lost motion device such as an elongated slot 42 formed in the end of rod 40, a pin 43 housed in slot 42 and secured to main operating lever 41, and a slidable plunger 44 and compression spring 45 also housed in slot 42 intermediate pin 43 and the outer end of said slot. A stop 46 is also provided on valve casing 29 to prevent further movement of lever 39 and rod 40 after valve body 30 has been rotated to the position shown in Fig. 3, wherein the supercharger is in inactive position. Any further movement of main control lever 41 to the right, as viewed in Figs. 1 and 2, will then merely compress spring 45.

Main control lever 41 is pivotally mounted as at 47 at a location, such as in the cockpit of an airplane, where it is under the immediate control of the operator of engine 5, and is provided with a suitable connection to throttle valve 11 so that the same control lever 41 may govern the operation of both supercharger 15 and throttle valve 11. In the embodiment illustrated in Figs. 1 and 4, a rod 48 is pivotally connected to the lower end of main operating lever 41, extends forwardly and has an operative connection with operating lever 49 of throttle valve 11 comprising a lost motion device, similar to that provided between rod 40 and lever 41, consisting of an elongated slot 50 formed in the end of rod 48, a pin 51 carried by throttle valve operating lever 49 and housed in slot 50, and a slidable plunger 52 and compression spring 53 also housed in slot 50 intermediate pin 51 and the outer end of said slot. A suitable stop 54 is also provided secured to intake pipe 10 in such a position as to prevent further rotation of lever 49 when throttle valve 11 has been moved to its fully opened position, as shown in the drawings, Fig. 4.

Main control lever 41 is also provided with a suitable handle or grip 55 which embodies means for normally preventing movement of said lever beyond the position in which throttle valve 11 is fully opened. As shown, a ratchet-like finger 56 is pivotally mounted on control lever 41 as at 57 with its outer end maintained in engagement with the surface of a segment 58 as by a spring 59 secured to an extension 60 of finger 56 and to handle 55. Segment 58 is provided with an upwardly projecting throttle-stop 61 adapted to be abutted by finger 56 when control lever 41 reaches the position in which throttle valve 11 is fully opened. Handle 55 also houses a plunger 62 having an enlarged head 63 normally resiliently urged upward to project beyond the surface of handle 55 by a spring 64, and having its lower end in contact with extension 60 of finger 56. By pressing upon head 63, the operator may rotate finger 56 about its pivot 57 so as to lift its outer end over throttle stop 61 and allow main control lever 41 to be moved further to the left, as viewed in the drawings, so as to actuate the valve of servo-motor 25 to connect supercharger 15 to engine 5.

The operation of the embodiment of the invention just described is as follows: With engine 5 at rest, or idling with the throttle valve 11 in its closed position, main control lever 41 occupies its extreme clockwise position, indicated by the broken lines in Figs. 1 and 2, rod 48 is in its furthest left position with pin 51 abutting the right end of slot 50 and spring 53 fully extended, rod 40 is in its extreme right position with valve operating lever 39 abutting stop 46 and pin 43 adjacent the right end of slot 42 with spring 45 fully compressed, and the parts of servo-motor 25 and clutch members 16 and 17 are in the positions indicated in Figs. 1 and 3. If it is then desired to speed up the engine by opening throttle valve 11, the operator grasps handle 55 of main control lever 41 and moves the latter in a counter-clockwise direction about its pivot, thereby drawing rod 48 and throttle valve lever 49 to the right to open throttle valve 11, spring 53 being sufficiently strong to withstand compression during this valve opening movement. At the same time, pin 43 moves freely within slot 42, releasing the compression of spring 45 but causing no movement of rod 40. When throttle valve 11 is fully opened, the end of finger 56 will abut throttle-stop 61 and prevent further counter-clockwise movement of main control lever 41.

During this throttle opening movement of lever 41, the parts of servo-motor 25 and clutch members 16 and 17 maintain the positions shown in Figs. 1 and 3, and it will be understood that the oil supplied to pipe 32 by pump 34 passes through valve passage 31 to left-hand pipe 28, into the left-hand end of casing 26, out through the left-hand discharge opening 35 and through pipe 37 to the lubricating passages of supercharger 15 and pipe 38 and returned to the lubricating system of engine 5.

If it is then desired to start supercharger 15, the operator may press down upon head 63 of plunger 62, overcoming springs 64 and 59, and through the engagement between the lower end of said plunger and extension 60, lift the outer end of finger 56 over throttle stop 61 so as to permit further counter-clockwise movement of main control lever 41. Since in full open throttle position pin 43 abuts the left end of slot 42, any further counter-clockwise movement of lever 41 moves rod 40 to the left and rotates valve lever 39 away from its stop 46, thereby reversing the connections between pipes 32, 33 and 28. The oil supplied through pipe 32 is then conducted through one of the passages 31 of valve body 30 to the right-hand pipe 28 and delivered thereby into the right-hand end of casing 26 of servo-motor 25 where it exerts its pressure against piston 27 and moves the latter to the left, which movement, through piston rod 24, link 23 and shifting lever 19, moves clutch member 17 into engagement with clutch member 16 and drivably connects supercharger 15 to engine 5. Supercharger 15 will now be driven from the engine and will provide, through conduit 14, air under pressure to carburetor 9 to form a supercharged mixture for delivery to the engine.

During this movement of piston 27 the oil contained in the left-hand end of casing 26 is forced out, first, through left-hand discharge opening 35 and then, as said opening is closed by piston 27, through left-hand pipe 28 and the cooperating valve passage 31 into return pipe 33, whereby the oil is returned to the engine sump. During the movement of main control lever 41 to drivably engage supercharger 15 with the engine, further movement of throttle valve 11, which is then in full open position, is prevented, since lever 49 abuts stop 54, thereby effecting only compression of spring 53 during further movement of rod 48 to the right during counter-clockwise movement of control lever 41.

To disconnect the supercharger from the engine, it is only necessary to move control lever 41 in the opposite, or clockwise direction, thereby again reversing the connections between pipes 32, 33 and 28 and again directing the pressure of the oil supplied by pipe 32 against the left-hand side of piston 27 to move said piston to the right and disengage clutch members 16 and 17. During this movement, slot 50 of rod 48 has free movement relative to pin 51, merely allowing expansion of spring 53 without movement of throttle valve 11. When control lever 41 has been returned to the position shown in Figs. 1 and 2, however, in which position the supercharger is fully disconnected from the engine, further clockwise movement of said lever will serve only to close throttle valve 11 due to the abutment of pin 51 against the right end of slot 50, no further movement of rod 40 taking place, due to the abutment of lever 39 against stop 46, pin 43 moving freely in slot 42 and compressing spring 45.

Another and somewhat more simplified form of controlling means is shown in Fig. 5, wherein main control lever 41' is pivotally mounted as at 47' at any desired location in the vehicle, and is provided with a throttle operating rod 48' pivotally connected to lever 41' at a point intermediate its pivot point 47' and its handle or grip 55' and with novel releasable means for operatively connecting to said lever 41' the rod 40' which is adapted to operate the servo-motor valve.

As shown, rod 40' is provided at its end with an enlarged member 65, threaded thereon for adjustment, having a laterally projecting pin 66 adapted to engage and oscillate in a guiding slot 67 formed in a segment 58', and a notch 68 in its lower surface adapted to be engaged by the hooked end 69 of a lever 70 pivotally mounted as at 71 on main control lever 41'. The end of lever 70 opposite to hooked end 69 is provided with a laterally extending pin or follower 72 which is continuously maintained in contact with a cam surface 73 formed on segment 58' by a suitable spring 74. Cam surface 73 is preferably provided with high and low portions so designed that when pin 72 is riding on the high portion, rod 48' is actuating the throttle valve 11 and hooked end 69 of lever 70 is disengaged from notch 68, thus rendering servo-motor valve operating rod 40' idle. When pin 72 passes onto the low portion of the cam surface 73, as shown in Fig. 5, hooked end 69 engages notch 68 and main control rod 41' is operatively connected to rod 40' so that the servo-motor valve may be actuated to control the supercharger.

It will be understood that during the time when pin 72 is in contact with the low portion of cam surface 73, no movement of throttle valve 11 is caused when main control rod 41' is moved, due to the provision of a lost motion device at the forward end of rod 48' similar to that shown in Fig. 4 but with the relative positions of the pin 51 and spring 53 reversed because of the connection of rod 48' to lever 41' intermediate its pivot 47' and handle 55'. With the exception of the changes incident to the described differences in construction, the operation of this second embodiment is similar to that previously set forth in connection with the first embodiment.

Figure 6:
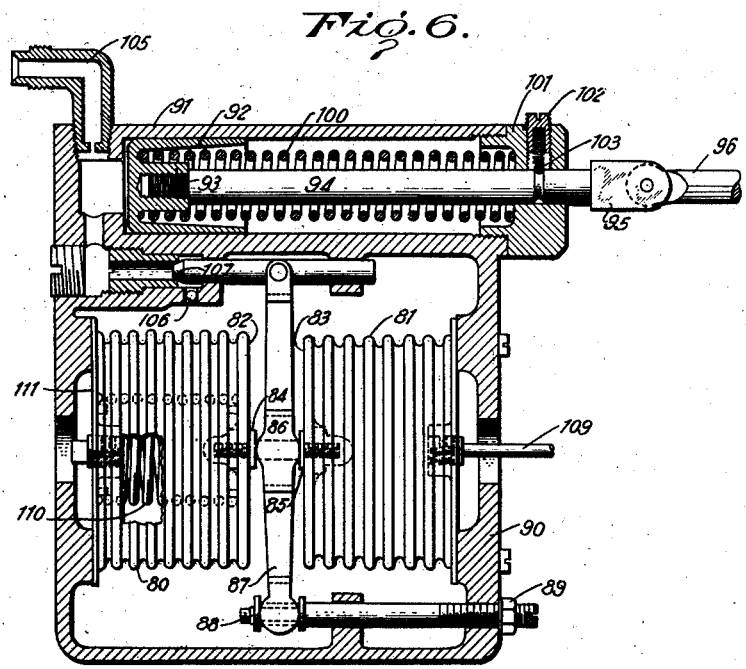
Fig. 6 is a view in elevation of a device for automatically controlling the operation.

In place of the manually controlled servo-motor 25, or in addition thereto, there may be employed automatic control means whereby the amount of air entering the supercharger may be varied in response to changes in supercharger pressure. Such a pressure-responsive device is indicated in Fig. 6 as taking the form of a pair of associated expansible chamber elements 80 and 81, preferably of the flexible diaphragm or bellows type as indicated. The two diaphragms are disposed in alignment and with their inner walls 82 and 83 provided with plates 84 and 85 for engagement with the enlarged central portion 86 of a floating lever 87, the lower end of which has a sliding connection with a rod 88, the setting of the rod being adjustable by means such as a nut 89 engageable with the frame 90 in which the rod is supported, and in which the members 80 and 81 are enclosed.

The upper end of lever 87 is pivotally connected to the stem of a needle valve 107 which controls the escape of fluid under pressure from the cylinder 91 in which is housed a piston 92 having a hub 93 to which is threaded a rod 94 whose outer end 95 is connected to a link 96 controlling the supercharger intake valve. Fig. 7 shows one manner of attachment of this link to the apparatus of Fig. 1, and the preferred location of the unit 90 relative thereto.

The piston 92 is adapted to be urged in one direction by a coil spring 100 engaging therewith at one end and seated at its opposite end against the abutment 101, said abutment being provided with a recessed member 102 in which is mounted a spring pressed friction device 103 yieldingly engaging a groove in the rod 94 to offer a certain yielding resistance to movement thereof in either direction from the position shown in Fig. 6.

The piston 92 is adapted to be actuated in the opposite direction by any suitable pressure exerting medium such as oil from the engine pump, a connection from such source of pressure to the cylinder 91 being indicated at 105, while the exhaust conduit for permitting discharge of the pressure fluid is shown at 106, such exhaust being controlled by needle valve 107, as above stated. Conduit 106 preferably passes through the wall of frame 90 and may if desired, be connected to the engine sump.

The interior of the element 81 is connected by a conduit 109 to the conduit 14 or manifold of the engine so that it is normally subject of the pressure of the air being delivered to the engine. Element 80 is sealed with or without air therein, and is provided with a coil spring 110 engaging at one end with the abutment 111 of the element 80, and exerting a predetermined pressure on the plate 84. It is apparent therefore, that the stress in the spring 110, in conjunction with the setting of the nut adjustment 89, determines the measure of response of lever 87 to the air pressure in the engine manifold. Since the setting of valve 107 is governed by the action of lever 87, and since the pressure in cylinder 91 depends on the position of the valve 107, it follows that the position of the piston 92 will be varied in response to changes in pressure in the engine manifold, and hence valve 112 at the supercharger intake will be moved to automatically maintain a predetermined pressure in conduit 14, regardless of changes in altitude or speed of the engine, within the limits of supercharger 15.

It will be seen that there is thus provided by the present invention a novel form of control for the supercharger and throttle of an internal combustion engine which not only correlates the operation of these two elements but also permits the force necessary for connecting and disconnecting the supercharger to and from the engine to be derived from the engine itself. Novel servomotor means have been provided for this purpose which are actuated by the pressure derived from a fluid maintained in circulation by the engine itself, the control of the flow of this fluid being under the control of the operator so that by a very slight application of force he can govern the application of a greater amount of energy necessary to make and break the driving connection between the supercharger and the engine. A common control lever has been provided for both the throttle and the supercharger, and lost motion or automatically releasable means have been associated therewith in order that the supercharger may be maintained inoperative and inactive until after the throttle valve has been fully opened, and also so that further movement of the throttle valve is prevented during the time that the supercharger is connected to the engine. The simplicity of the control system thus provided, and the improved efficiency of operation incident to the combination of throttle and supercharger controls in the manner described, results in a control which is well adapted for the purposes intended, reduces weight and provides a device which is simple and rugged in structure and dependable in operation.

It will be obvious that the invention is not limited to the forms shown in the drawings but is capable of a variety of mechanical embodiments. For example, any suitable lost motion device may be substituted for the one shown, and other forms of clutch may obviously be employed between the supercharger and the engine. Various other changes, which will now appear to those skilled in the art, may be made in the form, details of construction and arrangement of the parts without departing from the spirit of the invention, and reference is therefore to be had to the appended claims for a definition of the limits of the invention.

What is claimed is:

1. In an internal combustion engine, a supercharger normally inoperative and disconnected from said engine but adapted to be drivably connected thereto, means for making and breaking the driving connection between said engine and supercharger including a clutch, a servo-motor having a piston operatively connected to said clutch, means for supplying oil under pressure to said servo-motor from the lubricating system of said engine, means for alternately directing the flow of said oil against opposite sides of said piston to actuate said motor and shift said clutch, a throttle valve for said engine, a lever under the control of the operator for governing the actuation of said throttle valve and said servo-motor in sequence, a stop for arresting movement of said lever when the throttle valve is fully opened, said lever being arranged to govern both valve and servo-motor by a continuous arcuate movement in the same plane, and a releasable latch engaging said stop for preventing accidental actuation of the servo-motor.

2. In an internal combustion engine having a manifold, a throttle therein, a supercharger having an air control, means for driving said supercharger including a clutch, a hydraulic servo-motor for the clutch, a hydraulic servo-motor for the air control, a common source of hydraulic pressure for operating both servo-motors, a manually actuated control for the clutch servo-motor, and a control actuated by manifold pressure for governing the other servo-motor.

3. In an internal combustion engine having a manifold, a throttle therein, a supercharger for the engine, means for driving the supercharger including a clutch, control means operable by the operator for first opening the throttle and thereafter engaging the supercharger clutch, a valve controlling the admission of air to said supercharger, and means responsive to the pressure in said manifold between the valve and the engine for opening said valve when the manifold pressure is reduced.

4. In an internal combustion engine having a manifold, a throttle therein, a supercharger for the engine, means for driving the supercharger including a clutch, means operable by the operator for first opening the throttle and thereafter engaging the supercharger clutch, a valve controlling the admission of air to said supercharger, and means responsive to manifold pressure for controlling said valve.

5. In an internal combustion engine having a manifold, a throttle therein, a supercharger for the engine, means for driving the supercharger including a clutch, means operable by the operator for first opening the throttle and thereafter engaging the supercharger clutch, a valve controlling the admission of air to said supercharger, and means responsive to manifold pressure between the valve and the throttle for controlling said valve.

6. In an internal combustion engine having a manifold, a throttle therein, a supercharger for the engine, means for driving the supercharger including a clutch, means operable by the operator for first opening the throttle and thereafter engaging the clutch, a valve controlling the admission of air to said supercharger, said throttle, said supercharger and valve being arranged in series for controlling the passage of gases through the manifold, and means responsive to manifold pressure for controlling said valve.

7. In an internal combustion engine having a manifold, a throttle therein, a supercharger for the engine, means for driving the supercharger including a clutch, means operable by the operator for first opening the throttle and thereafter engaging the clutch, a valve controlling the admission of air to said supercharger, said throttle, said supercharger and valve being arranged in series for controlling the passage of gases through the manifold, and means responsive to manifold pressure between the supercharger and the engine for controlling said valve.

DAVID GREGG.